US012348953B2

(12) United States Patent
Eubank et al.

(10) Patent No.: US 12,348,953 B2
(45) Date of Patent: *Jul. 1, 2025

(54) PROCESSING SOUND IN AN ENHANCED REALITY ENVIRONMENT

(71) Applicant: Apple Inc., Cupertino, CA (US)

(72) Inventors: Christopher T. Eubank, Santa Barbara, CA (US); Joshua D. Atkins, Los Angeles, CA (US); Soenke Pelzer, San Jose, CA (US); Dirk Schroeder, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/611,407

(22) Filed: Mar. 20, 2024

(65) Prior Publication Data
US 2024/0236610 A1    Jul. 11, 2024

Related U.S. Application Data

(63) Continuation of application No. 17/360,823, filed on Jun. 28, 2021, now Pat. No. 11,956,623, which is a continuation of application No. PCT/US2020/032274, filed on May 9, 2020.

(60) Provisional application No. 62/848,367, filed on May 15, 2019.

(51) Int. Cl.
*H04S 7/00* (2006.01)

(52) U.S. Cl.
CPC .......... *H04S 7/305* (2013.01); *H04S 2420/01* (2013.01)

(58) Field of Classification Search
CPC ........ H04S 7/305; H04S 2420/01; H04S 7/30; H04S 3/002
USPC ......................................................... 381/303
See application file for complete search history.

(56) References Cited

U.S. PATENT DOCUMENTS

2018/0232471 A1* 8/2018 Schissler ............. G06F 18/2413

\* cited by examiner

*Primary Examiner* — Vivian C Chin
*Assistant Examiner* — Douglas J Suthers
(74) *Attorney, Agent, or Firm* — Aikin & Gallant, LLP

(57) ABSTRACT

Processing sound in an enhanced reality environment can include generating, based on an image of a physical environment, an acoustic model of the physical environment. Audio signals captured by a microphone array, can capture a sound in the physical environment. Based on these audio signals, one or more measured acoustic parameters of the physical environment can be generated. A target audio signal can be processed using the model of the physical environment and the measured acoustic parameters, resulting in a plurality of output audio channels having a virtual sound source with a virtual location. The output audio channels can be used to drive a plurality of speakers. Other aspects are also described and claimed.

25 Claims, 7 Drawing Sheets

PROCESSING SOUND IN AN ENHANCED REALITY ENVIRONMENT

This application is a continuation of U.S. application Ser. No. 17/360,823 filed Jun. 28, 2021, which is a continuation of International Application No. PCT/US2020/032274 filed May 9, 2020, which claims priority to U.S. Provisional Application No. 62/848,367 filed May 15, 2019, which are incorporated herein by reference.

FIELD

One aspect of the disclosure herein relates to audio processing in an enhanced reality environment.

BACKGROUND

Microphone arrays, which can be embedded in consumer electronic devices (for example, a mobile phone or tablet), can facilitate a means for capturing sound and rendering spatial (3D) sound. Signals captured by microphones can contain 3D acoustic information about space. 3D audio rendering can be described as the processing of an audio signal (such as a microphone signal or other recorded or synthesized audio content) so as to yield sound produced by a multi-channel speaker setup, e.g., stereo speakers, surround-sound loudspeakers, speaker arrays, or headphones. Sound produced by the speakers can be perceived by the listener as coming from a particular direction or all around the listener in three-dimensional space. For example, one or more of such virtual sound sources can be generated in a sound program that will be perceived by a listener to be behind, above or below the listener, or panned from one side of the listener to another.

SUMMARY

Various examples of electronic systems and techniques for using such systems in relation to various enhanced reality technologies are described.

A physical setting refers to a world with which various persons can sense and/or interact without use of electronic systems. Physical settings, such as a physical park, include physical elements, such as, for example, physical wildlife, physical trees, and physical plants. Persons can directly sense and/or otherwise interact with the physical setting, for example, using one or more senses including sight, smell, touch, taste, and hearing.

An enhanced reality (ER) setting, in contrast to a physical setting, refers to an entirely (or partly) computer-produced setting that various persons, using an electronic system, can sense and/or otherwise interact with. In ER, a person's movements are in part monitored, and, responsive thereto, at least one attribute corresponding to at least one virtual object in the ER setting is changed in a manner that is consistent with one or more physical laws. For example, in response to an ER system detecting a person looking upward, the ER system may adjust various audio and graphics presented to the person in a manner consistent with how such sounds and appearances would change in a physical setting. Adjustments to attribute(s) of virtual object(s) in an ER setting also may be made, for example, in response to representations of movement (e.g., voice commands).

A person may sense and/or interact with an ER object using one or more senses, such as sight, smell, taste, touch, and sound. For example, a person may sense and/or interact with objects that create a multi-dimensional or spatial acoustic setting. Multi-dimensional or spatial acoustic settings provide a person with a perception of discrete acoustic sources in multi-dimensional space. Such objects may also enable acoustic transparency, which may selectively incorporate audio from a physical setting, either with or without computer-produced audio. In some ER settings, a person may sense and/or interact with only acoustic objects.

Virtual reality (VR) is one example of ER. A VR setting refers to an enhanced setting that is configured to only include computer-produced sensory inputs for one or more senses. A VR setting includes a plurality of virtual objects that a person may sense and/or interact with. A person may sense and/or interact with virtual objects in the VR setting through a simulation of at least some of the person's actions within the computer-produced setting, and/or through a simulation of the person or her presence within the computer-produced setting.

Mixed reality (MR) is another example of ER. An MR setting refers to an enhanced setting that is configured to integrate computer-produced sensory inputs (e.g., virtual objects) with sensory inputs from the physical setting, or a representation of sensory inputs from the physical setting. On a reality spectrum, an MR setting is between, but does not include, a completely physical setting at one end and a VR setting at the other end.

In some MR settings, computer-produced sensory inputs may be adjusted based on changes to sensory inputs from the physical setting. Moreover, some electronic systems for presenting MR settings may detect location and/or orientation with respect to the physical setting to enable interaction between real objects (i.e., physical elements from the physical setting or representations thereof) and virtual objects. For example, a system may detect movements and adjust computer-produced sensory inputs accordingly, so that, for example, a virtual tree appears fixed with respect to a physical structure.

Augmented reality (AR) is an example of MR. An AR setting refers to an enhanced setting where one or more virtual objects are superimposed over a physical setting (or representation thereof). As an example, an electronic system may include an opaque display and one or more imaging sensors for capturing video and/or images of a physical setting. Such video and/or images may be representations of the physical setting, for example. The video and/or images are combined with virtual objects, wherein the combination is then displayed on the opaque display. The physical setting may be viewed by a person, indirectly, via the images and/or video of the physical setting. The person may thus observe the virtual objects superimposed over the physical setting. When a system captures images of a physical setting, and displays an AR setting on an opaque display using the captured images, the displayed images are called a video pass-through. Alternatively, a transparent or semi-transparent display may be included in an electronic system for displaying an AR setting, such that an individual may view the physical setting directly through the transparent or semi-transparent displays. Virtual objects may be displayed on the semi-transparent or transparent display, such that an individual observes virtual objects superimposed over a physical setting. In yet another example, a projection system may be utilized in order to project virtual objects onto a physical setting. For example, virtual objects may be projected on a physical surface, or as a holograph, such that an individual observes the virtual objects superimposed over the physical setting.

An AR setting also may refer to an enhanced setting in which a representation of a physical setting is modified by computer-produced sensory data. As an example, at least a portion of a representation of a physical setting may be graphically modified (e.g., enlarged), so that the modified portion is still representative of (although not a fully-reproduced version of) the originally captured image(s). Alternatively, in providing video pass-through, one or more sensor images may be modified in order to impose a specific viewpoint different than a viewpoint captured by the image sensor(s). As another example, portions of a representation of a physical setting may be altered by graphically obscuring or excluding the portions.

Augmented virtuality (AV) is another example of MR. An AV setting refers to an enhanced setting in which a virtual or computer-produced setting integrates one or more sensory inputs from a physical setting. Such sensory input(s) may include representations of one or more characteristics of a physical setting. A virtual object may, for example, incorporate a color associated with a physical element captured by imaging sensor(s). Alternatively, a virtual object may adopt characteristics consistent with, for example, current weather conditions corresponding to a physical setting, such as weather conditions identified via imaging, online weather information, and/or weather-related sensors. As another example, an AR park may include virtual structures, plants, and trees, although animals within the AR park setting may include features accurately reproduced from images of physical animals.

Various systems allow persons to sense and/or interact with ER settings. For example, a head mounted system may include one or more speakers and an opaque display. As another example, an external display (e.g., a smartphone) may be incorporated within a head mounted system. The head mounted system may include microphones for capturing audio of a physical setting, and/or image sensors for capturing images/video of the physical setting. A transparent or semi-transparent display may also be included in the head mounted system. The semi-transparent or transparent display may, for example, include a substrate through which light (representative of images) is directed to a person's eyes. The display may also incorporate LEDs, OLEDs, liquid crystal on silicon, a laser scanning light source, a digital light projector, or any combination thereof. The substrate through which light is transmitted may be an optical reflector, holographic substrate, light waveguide, optical combiner, or any combination thereof. The transparent or semi-transparent display may, for example, transition selectively between a transparent/semi-transparent state and an opaque state. As another example, the electronic system may be a projection-based system. In a projection-based system, retinal projection may be used to project images onto a person's retina. Alternatively, a projection-based system also may project virtual objects into a physical setting, for example, such as projecting virtual objects as a holograph or onto a physical surface. Other examples of ER systems include windows configured to display graphics, headphones, earphones, speaker arrangements, lenses configured to display graphics, heads up displays, automotive windshields configured to display graphics, input mechanisms (e.g., controllers with or without haptic functionality), desktop or laptop computers, tablets, or smartphones.

In an enhanced reality environment, a user in the enhanced reality environment can hear computer generated sounds that match room acoustics of the enhanced reality setting. In one aspect, virtualized sound sources that are placed in the enhanced reality setting can be processed so that the virtualized sound source sounds as if it would in a physical setting resembling the enhanced reality setting. In one aspect, the enhanced reality setting can be generated to match a physical environment of the user. Sounds that are imported to the enhanced reality environment can be rendered so that they sound natural in the enhanced reality environment.

For example, if two people are in the same physical room (room A) and a third person is in a different physical room, a method or system can generate an enhanced reality experience where all users sound as if they are in room A, by bringing the third person's voice into the environment of room A. This can provide a more immersive and natural enhanced reality experience for users. A problem, however, in rendering the voice of the third person to sound like they are in room A is that the rendering should account for unique properties of room A such as reverberation, room size, room geometry, objects in the room, sound absorption of surfaces, directional pattern for speech reproduction (directivity), and other room properties. In addition, the third person is in a different room that can have different acoustic properties that can be heard in the third person's speech.

It may be beneficial to process the third person's voice, or virtual sound sources, to match an enhanced reality setting. For example, in one aspect, images can be generated from a camera of a device. The device can be a mobile device such as a computer tablet or a smart phone. The device can also be a head worn device. Cameras, for example, those that are integral to such devices, can generate images of the physical setting or environment. Object detection, room geometry estimation, room layout extraction, and object alignment to come up with a room configuration estimation including the locations of walls and objects in the room can be detected in the image and then modeled.

This information, generated based on the image(s), can be combined with estimates for acoustic parameters of the room that are obtained from the microphones of the device. Using a room geometry optimized for acoustic simulation (e.g., an acoustically correct or simplified version of the physical room configuration) along with the acoustic parameter estimation, one can characterize the acoustics of the physical environment. The characterization can be sent to other applications or users for processing. In this case, other users that are brought into the virtual setting can experience a virtualized audio that matched that of the enhanced reality setting, which in turn, matches that of the physical environment, for example, of the user.

In one aspect, a method for processing sound in an enhanced reality environment is described. The method includes: receiving an image captured by a camera, the image showing a physical environment; generating, based on the image, an estimated model of the physical environment, wherein the estimated model comprises a three dimensional representation of the physical environment; receiving audio signals captured by a microphone array, the audio signals capturing a sound in the physical environment; generating one or more measured acoustic parameters of the physical environment based on the received audio signals; and processing a target audio signal using the estimated model and the measured acoustic parameters, resulting in a plurality of output audio channels having a virtual sound source with a virtual location, the output audio channels used to drive a plurality of speakers.

In one aspect, the processing of the target audio signal includes modifying one or more acoustic surface material parameters of the estimated model, based on the measured acoustic parameters, resulting in an updated model of the physical environment; selecting or generating one or more impulse responses based on the updated model; and convolving the target audio signal and a target location with the one or more impulse responses to generate the plurality of output audio channels.

In one aspect, an article of manufacture that processes audio in an enhanced reality environment is described. The article of manufacture includes: a camera, capturing an image of a physical environment; a microphone array, capturing a sound in the physical environment; a plurality of speakers (e.g., headphones); and a machine readable medium having stored therein instructions that, when executed by a processor, cause the article of manufacture to perform the following: generating, based on the image, an estimated model of the physical environment, wherein the estimated model comprises a three dimensional representation of the physical environment; receiving the audio signals captured by the microphone array; generating one or more measured acoustic parameters of the physical environment based on the received audio signals; processing a target audio signal using the estimated model and the measured acoustic parameters, resulting in a plurality of output audio channels having a virtual sound source with a virtual location; and driving the plurality of speakers with the output audio channels in the virtualized environment.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the Claims section. Such combinations may have particular advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Several aspects of the disclosure with reference to the appended drawings are now explained. Whenever the shapes, relative positions and other aspects of the parts described are not explicitly defined, the scope of the invention is not limited only to the parts shown, which are meant merely for the purpose of illustration. Also, while numerous details are set forth, it is understood that some aspects of the disclosure may be practiced without these details. In other instances, well-known circuits, structures, and techniques have not been shown in detail so as not to obscure the understanding of this description.

Enhanced Reality Sound Processing

Figure 1:
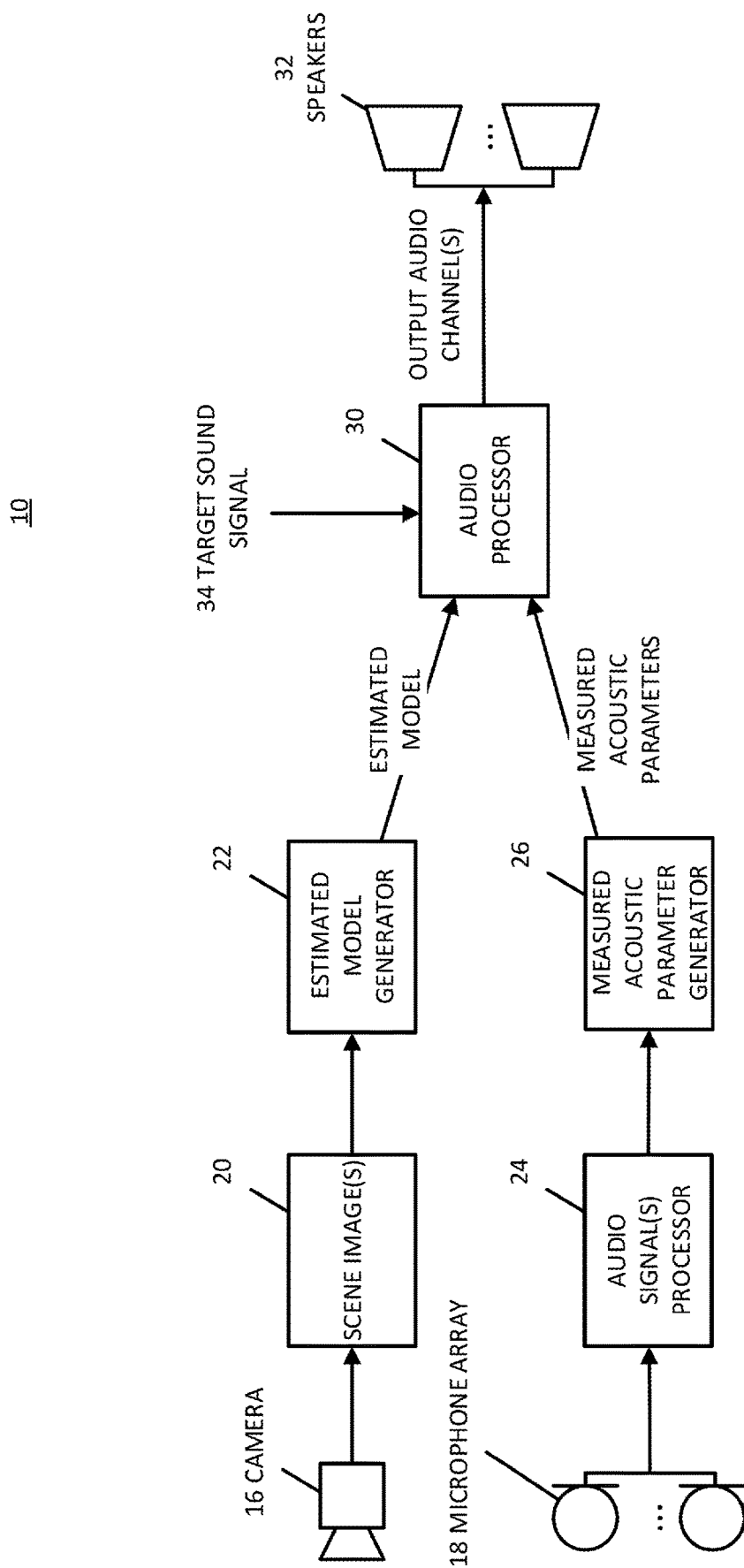
FIG. 1 illustrates a flow diagram of a method or device that processes a sound in an enhanced reality environment, in one aspect.

Referring now to FIG. 1, a system, method, or device 10 is shown for processing sound in an enhanced reality environment, in one aspect. An enhanced reality environment can include spatialized sound and, optionally, a visual component with virtual content rendered with images that depict the physical environment.

A camera 16 generates one or more scene images 20 of a physical environment. An estimated model generator 22 generates, based on the one or more scene images, an estimated model of the physical environment. The estimated model can include a three dimensional space representation of the physical environment, and one or more environmental parameters of the physical environment.

The one or more environmental parameters can include one or more acoustic surface material parameters and/or scattering parameters of the room and detected objects. The environmental parameters can be frequency dependent, e.g., different parameters can be estimated to correspond to different frequencies. The estimated model can be stored in known data structures, for example, as a voxel grid or a mesh data structure. Acoustic surface material parameters can include sound absorption parameters that are dependent on a material (e.g., a surface material) of a surface, object or room. Scattering parameters of a surface or object can be a geometrical property based on or influenced by the size, structure, and/or shape of a surface or object. The estimated model can therefore include a physical room geometry as well as objects detected in the physical environment and environmental parameters of the room and the objects.

The estimated model can be generated through computer vision techniques such as object recognition. Trained neural networks can be utilized to recognize objects and material surfaces in the image. Surfaces can be detected with 2D cameras that generate a two dimensional image (e.g., a bitmap). 3D cameras (e.g., having one or more depth sensors) can also be used to generate a three dimensional image with two dimensional parameters (e.g., a bitmap) and a depth parameter. Thus, camera 16 can be a 2D camera or a 3D camera. Model libraries can be used to define identified objects in the scene image. Additional aspects are described and claimed.

One or more microphone arrays 18 can capture audio signals that capture one or more sounds in the physical environment. An audio signal processor 24 can convert each of the audio signals from analog to digital with an analog to digital converter, as known in the art. In addition, the audio signal processor can convert each of the digital audio signals from the time domain to the frequency domain. A measured acoustic parameter generator 26 (e.g., a computer estimator) can generate one or more measured acoustic parameters of the physical environment. It should be understood that 'generating' the measured acoustic parameters includes estimating the measured acoustic parameters of the physical environment extracted from the microphone signals.

In one aspect, generating the one or more measured acoustic parameters includes processing the audio signals to determine a reverberation characteristic of the physical environment, the reverberation characteristic defining the one or more measured acoustic parameters of the environment. In one aspect, the one or more measured acoustic parameters can include one or more of the following: a reverberation decay rate or time, a direct to reverberation ratio, a reverberation measurement, or other equivalent or similar measurements. In one aspect, the one or more measured acoustic parameters of the physical environment are generated corresponding to one or more frequency ranges of the audio signals. In this manner, each frequency range (for example, a frequency band or bin) can have a corresponding parameter (e.g. a reverberation characteristic, decay rate, or other acoustic parameters mentioned). Parameters can be frequency dependent.

In one aspect, generating the one or more measured acoustic parameters of the physical environment includes extracting a direct component from the audio signals and extracting a reverberant component from the audio signals. A trained neural network can generate the measured acoustic parameters (e.g., a reverberation characteristic) based on the extracted direct component and the extracted reverberant component. The direct component may refer to a sound field that has a single sound source with a single direction, or a high directivity, for example, without any reverberant sounds. A reverberant component may refer to secondary effects of geometry on sound, for example, when sound energy reflects off of surfaces and causes reverberation and/or echoing.

It should be understood that the direct component may contain some diffuse sounds and the diffuse component may contain some directional, because separating the two completely can be impracticable and/or impractical. Thus, the reverberant component may contain primarily reverberant sounds where the directional components have been substantially removed as much as practicable or practical. Similarly, the direct component can contain primarily directional sounds, where the reverberant components have been substantially removed as much as practicable or practical.

Figure 6:
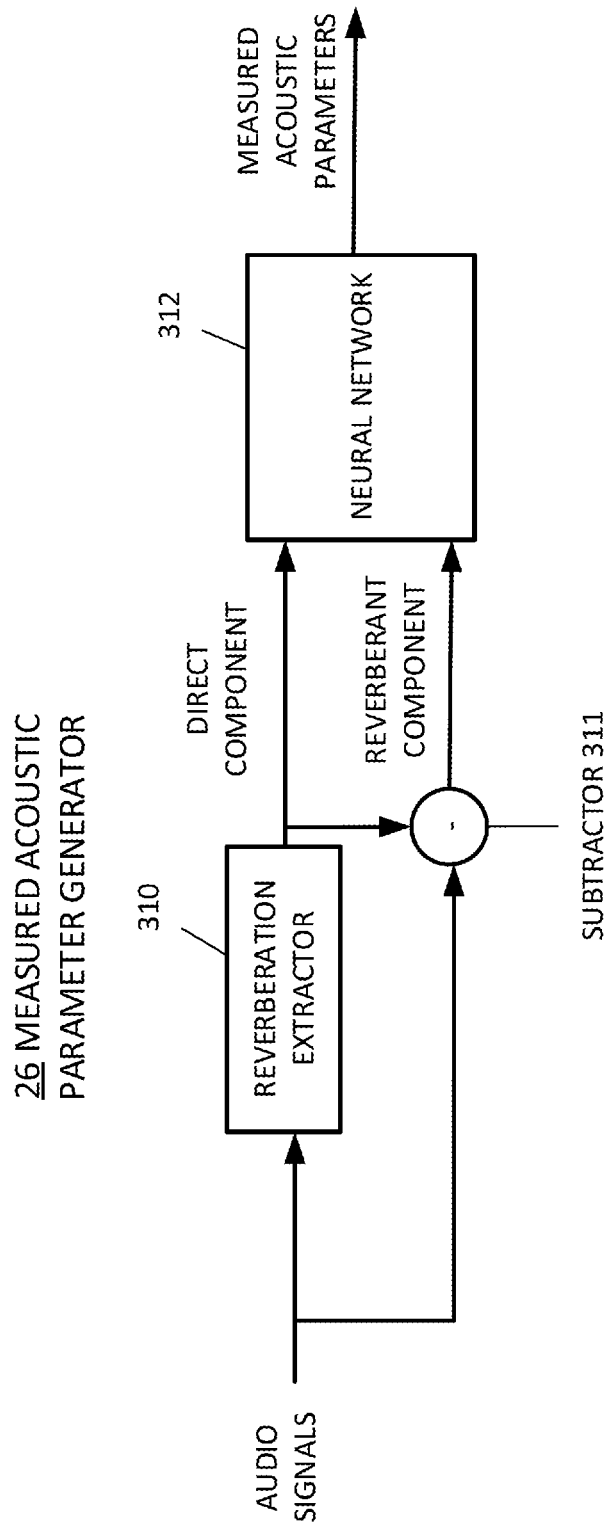
FIG. 6 illustrates flow diagram of an acoustic parameter generator in one aspect.

In one aspect, FIG. 6 shows that a measured acoustic parameter generator 26 can include a reverberation extractor 310 that removes reverberant components from input audio signals to extract a direct component. The input audio signals can be generated by microphones in the physical environment, and processed into frequency domain audio signals. The extractor can remove the reverberant component from the audio signals, outputting a direct component. The direct component can be subtracted from the input audio signals by a subtractor 311 to extract the reverberant component. Like the input audio signals, the direct component and reverberant component can also be in the frequency domain. These can be fed as inputs to a trained neural network 312 (e.g., a convolutional neural network) which can then generate measured acoustic parameters based on the direct component and reverberant component. In this manner, the measured acoustic parameters can be generated based on the audio signals generated by the microphones in the physical environment and fed into an enhanced reality audio processor to process a target sound signal, spatially, in an enhanced reality environment. In one aspect, the reverberation extractor can include a multi-channel dereverberator that performs linear dereverberation on each input processed audio signal to output a dereverberated direct component. In one aspect, the reverberation extractor can include a parametric multi-channel Wiener filter (PMWF) that applies the filter parameters to the input signals and outputs a dereverberated and de-noised direct component. In one aspect, the reverberation extractor can include both a multi-channel dereverberator and a PMWF.

Referring back to FIG. 1, the enhanced reality audio processor 30 can process a target audio signal 34 using the estimated model and the measured acoustic parameters, and generate output audio channels having a virtual sound source. The virtual sound source can have a virtual location within an enhanced reality environment. The output audio channels can be used to drive speakers 32 (e.g., of headphones). A target audio signal can be any sound, for example, a person's voice, the sound of a vehicle, a bird chirping, etc.

In one aspect, the processing of the target audio signal by the enhanced reality audio processor includes modifying and/or generating one or more acoustic surface material parameters and/or scattering parameters of the estimated model based on the measured acoustic parameters, resulting in an updated model of the physical environment. In this manner, the estimated model, being based on the image, can also have acoustic surface material parameters (e.g., sound absorption, scattering, or sound reduction parameters) that are optimized (e.g., increased or decreased) to more closely match the measured acoustic parameters of the physical environment. For example, the processing can include modifying the acoustic surface material parameters of the estimated model by increasing or decreasing one or more of the acoustic surface material parameters based on comparing an estimated or simulated acoustic response of the estimated model with the measured acoustic parameters of the environment. Thus, the method can optimize or tune acoustic parameters of the model (e.g., scattering characteristics/parameters, acoustic absorption coefficients, and/or sound reduction parameters of an object in the model) based on inputs from audio signals in the physical environment.

In one aspect, processing of the target audio signal includes wave based acoustic modeling of the enhanced reality environment. With a wave based method, dynamic response variables of the enhanced reality environment can be generated as wave functions. A weighted residual scheme can be used to enforce boundary residuals to zero to yield a wave model. Unlike conventional element based models like finite element method and boundary element method, that approximate shape functions to describe dynamic response variables, wave based models are small, which can improve computational efficiency. In one aspect, wave based modeling includes selecting wave functions for an environment, generating residual weights of boundary conditions and continuity conditions for the environment, and generating acoustic pressure fields and/or other acoustic parameters from the wave functions.

In another aspect, processing of the target audio signal includes geometrical acoustic techniques based on acoustic modeling of the enhanced reality environment. In one aspect of geometrical acoustics, sound power emitted by a sound source may have a number of rays which can be considered as indicators of energy. The rays can be modeled as traveling through space at the speed of sound, and are reflected after a collision with room boundaries. The initial energy of the rays may be weighted by the directivity model of the emitting sound source, or in another aspect the concentration of the rays may be distributed based on the directivity model of the emitting sound source. The energy of each ray decreases as a consequence of the sound absorption of the air and of the walls in which the ray collides with in the ray's path.

In one aspect, the processor can select or generate one or more impulse responses based on the updated model, and convolve the target audio signal and a target location with the one or more impulse responses to generate the plurality of output audio channels. In one aspect, the one or more impulse responses includes left and right components of a binaural room impulse response (BRIR). The target audio signal can then be processed with the BRIR so that the sound will appear to emanate from the target location in an enhanced reality environment, when the output audio drives left and right speakers of a headset.

The capture and processing of the scene images and the capture and processing of the audio signals can occur concurrently in the same physical environment. If, however, no sounds are detected to be present, the acoustic parameter generator can recall previously generated acoustic/environmental parameters. The system can lookup previously generated acoustic/environmental parameters that were generated in the same or similar physical environment, based on analysis of the image, GPS coordinates, available Wi-Fi networks, or other techniques that can identify the physical environment. The previously generated/estimated acoustic/environmental parameters can be selected based on a detected similarity between the image of the physical environment and a previous physical environment (e.g., stored as a model or as an image). Thus, by accessing previously generated stored acoustic/environmental parameters that correspond to the current physical environment, the system can beneficially provide acoustic/environmental parameters even if no sound is currently present.

In one aspect, the output audio channels drive the speakers in synchronism with a virtual visual object rendered on the image, and the virtual location of the virtual sound source corresponds to a visual location of the virtual visual object rendered on the image in the virtualized environment.

In one aspect, the virtual visual object can be rendered with the image to generate a virtual visual environment encoded in data; and a display can be driven with the data of the virtual visual environment. A device such as a tablet computer or a smart phone can have multiple cameras in front and the back, as well as a display. Thus, in some cases, a front facing camera can generate video of a user speaking while a back facing camera can generate video of the physical environment of the user.

For example, speech of a user in one room can be rendered as the virtual sound source having a virtual location in the enhanced reality environment, where the enhanced reality environment is based on a different room. A virtual visual object, e.g., an animation or image/video of the user, can be rendered in the enhanced reality environment. An animation (e.g., a video animation) of the user can by synchronized with the speech. Other users in the enhanced reality environment would perceive that the user is in the enhanced reality environment. If the processing of the user's speech is based on a model of the physical environment of the other users, then the user's speech can sound like they are in the same environment as the other users.

In one aspect, when multiple participants converse in the enhanced reality environment, some participants may be in the same room (e.g., participants 1 and 2 in room A) and others may be in different rooms (e.g., participant 3 in room B and participant 4 in room C). The participants can select which room will be conversed in. Assuming they choose to converse in room A, the speech of participant 3 and participant 4 can be processed to extract the direct portion of each of their respective speech signals. Meanwhile, participants 1 and 2 in room A can generate, with devices having cameras and microphones, an estimated model of room A (e.g., the layout of the room), optimized with the measured acoustic parameters of room A. The estimated model of room A can be shared among all participants. A spatial audio engine can process the speech signals of participant 3 and 4 and spatialize them into the enhanced reality environment using the estimated model of room A. In one aspect, all participant's speech (e.g., participants 1, 2, 3 and 4) can be processed so that the direct component is extracted (e.g., by removing the reverberant and/or diffuse sounds). The direct component of each participant can be shared with other participants to be rendered in the enhanced reality environment.

Thus, based on some aspects of the present disclosure, participants in a conference or group chat can feel as they have been transported to the environment of other participants (e.g., room A) because they can hear their own voices which are processed with room acoustics of the other participants. By sharing just the direct portion of the participants' voices over to other participants, the spatial audio engine can make it sound as if everyone is in the same room without some participants' voices being influenced by their own room acoustics.

Estimated Model of Physical Environment with Object Detection

Figure 2:
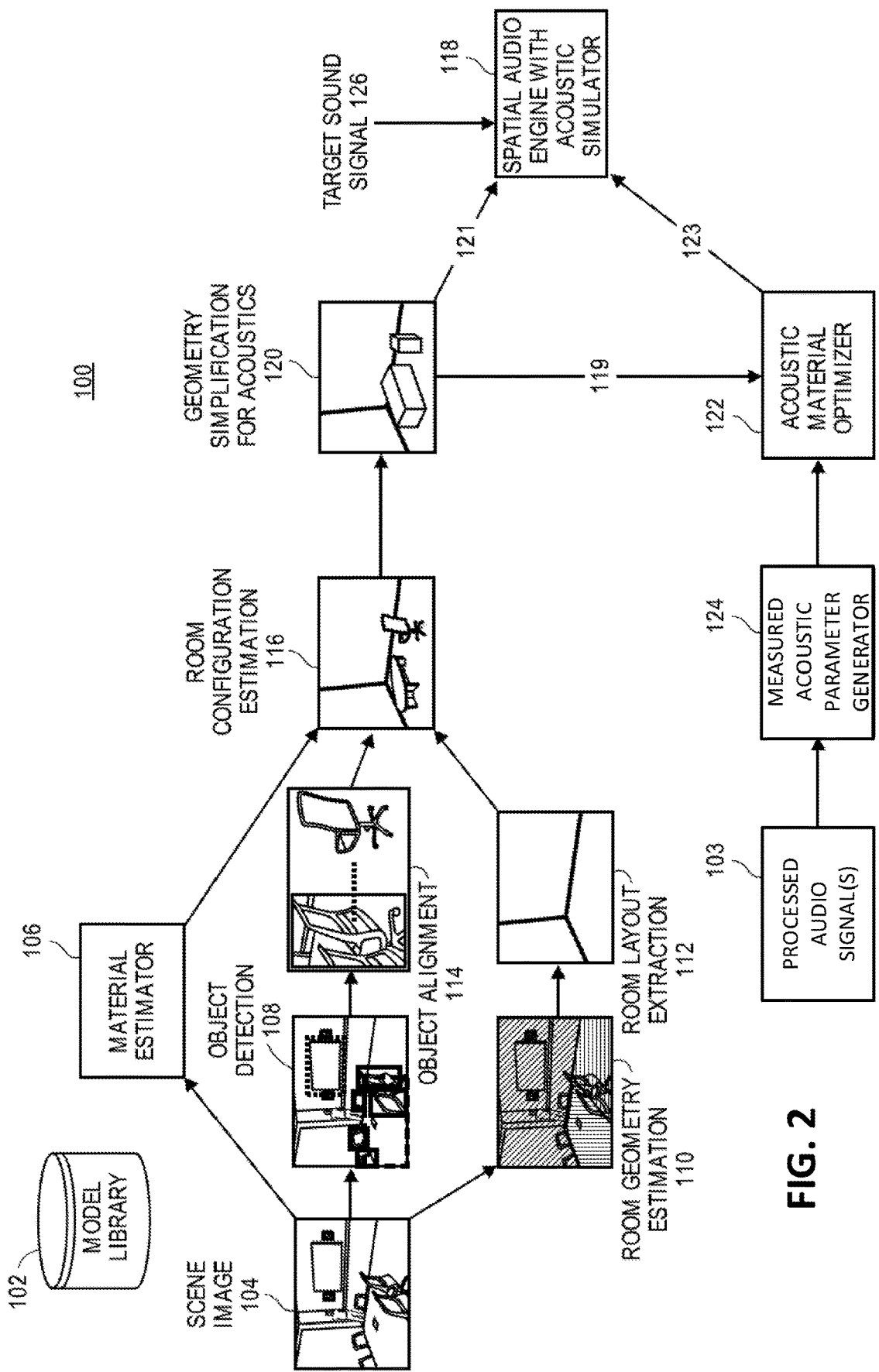
FIG. 2 illustrates a flow diagram of a method or device that processes a sound in an enhanced reality environment, in one aspect.

Referring now to FIG. 2, a system and process 100 is shown for processing sound in an enhanced reality environment, in one aspect. A scene image 104, generated by a camera, can show an image of the physical environment.

In object detection block 108, the image can be processed to recognize an object in the image (e.g., with known computer vision algorithms using a neural network trained to identify the object as corresponding to an object model in a model library 102). In object alignment block 114, positioning and orienting of the object model within the estimated model of the physical environment can be performed, thereby generating a representative model of the physical environment, and objects within the physical environment. The object model(s) can have three dimensional parameters that define a three dimensional shape of the object model, and acoustic metadata that define an acoustic response of the object. The acoustic metadata can include a sound absorption, sound reduction, and/or scattering parameters that may define the acoustic characteristics of the object and/or its child surfaces.

In one aspect, a block 110 performs room geometry estimation. This block estimates the size, shape, and/or volume of the physical environment, for example, if the physical environment is a room, the size, shape and/or volume of the room can be estimated. The room geometry estimation can include classifying regions of the image, and based on the classified regions, a room layout extraction block 112 can generate a geometry of the physical environment, including one or more of the following: a size or orientation of a wall, a size or orientation of a ceiling, a size or orientation of a floor, a height, width or length of a room, or a volume of the room. If the physical environment is only partially enclosed or completely open, the model can be generated having one or more walls, ceilings and floors, and/or partial walls, ceilings and floors to accurately reflect the physical environment.

In block 106, a material estimator can estimate acoustic surface material characteristics of the room and objects in the room, the acoustic surface material characteristics contributing to the acoustic surface material parameters of the estimated model. In one aspect, the acoustic surface material characteristics of the room can include, for example, an acoustic damping parameter, a sound absorption parameter, a scattering parameter, and/or a sound reduction parameter. In one aspect, each surface (e.g., wall, ceiling, and/or floor) of the room layout can have one or more parameters. For example, one of the walls (or a part of a wall) may have a color or texture that is associated with high sound damping. Thus, the material estimator can assign that wall, or part of that wall with a corresponding acoustic surface material characteristic, which may be greater than or less than other surfaces in the room model. In one aspect, the material estimator can generate similar parameters for each of the objects detected in object detection block 108.

In block 116, a room configuration estimation can generate an estimated model of the physical environment, having a room layout, objects aligned in the room, and acoustic surface material parameters associated with the room layout (e.g., of the walls, ceiling and/or floor) and/or associated with the objects.

In one aspect, a geometry simplification for acoustics block 120 can include simplifying a geometry of one or more object models of the estimated model with a geometry simplification algorithm to obtain a physical model with respect to acoustics. For example, a geometry simplification algorithm can reduce the total number of surfaces, edges, or loops of the object models. Thus, a model of a coffee table having detailed carvings can be simplified into a rectangle or a plane with poles (representing a surface with legs), or a coffee mug with a handle can be simplified into a cylinder. In this manner, the processing of a target audio signal can advantageously be performed based on the estimated model having the simplified geometry, which is a correct acoustic model. This can improve the processing efficiency and reduce unwanted artifacts that might be erroneously caused by too much detail in the object geometries.

In one aspect, the geometry simplification algorithm includes determining whether to remove an object model from the estimated model, to further simplify the overall geometry of the estimated model. This determination can be based, for example, on a wavelength (e.g., of a virtual sound source) and dimensions of the object, and/or a location of the object model relative to the target location of the target audio signal. In one aspect, if an object model is outside a threshold distance of a virtual location of a virtual sound source, then the object is removed. Otherwise, when the target audio signal is rendered in the enhanced reality environment (e.g., as the virtual sound source in the virtual location), the object may cause unwanted artifacts or blockage to the sound.

In one aspect, the geometry simplification algorithm simplifies a geometry of the object model more aggressively as a distance between the target location and the object model increases, and less aggressively as the distance between the target location and the object model decreases. A more aggressive simplification can mean that the simplified object has a reduced number of surfaces and/or vertices.

At block 124, processed audio signals 103 are received and, based on the audio signals, one or more measured acoustic parameters of the physical environment are generated, details of which are discussed with regard to FIG. 1.

At block 122, an acoustic material optimizer can modify one or more acoustic surface material parameters of the estimated model 119, based on the measured acoustic parameters, resulting in an updated model 123 of the physical environment. In one aspect, the estimated model has been simplified at block 120. In another aspect, the simplification block is removed and the acoustic material optimizer 122 can modify one or more acoustic surface material parameters of the estimated model where the estimated model has not been simplified. This decision as the whether or not to simplify the geometry, can be determined based on multiple factors, for example, depending on how complex the object shapes are, how much processing is required for simplification, a frame rate of an output audio, or a type of acoustic simulation that is performed on the target sound signal 126. For example, if wave based modeling is employed, then the simplification process may be removed. If a geometrical acoustics algorithm is employed, then the model can be simplified to remove details which can cause errors.

At block 118, a spatial engine with acoustic simulator can select or generate one or more impulse responses based on the updated model 123 and convolve the target audio signal 126 and a target location with the one or more impulse responses to generate the plurality of output audio channels. The output channels can be used to drive speakers.

In one aspect, at times where no sound is present in the physical environment, or where the sound appears to be distorted, block 118 can use the estimated model 121 without modification from the acoustic material optimizer 122. In this manner, the system and process can improve the accuracy of the room model by optimizing surface acoustic parameters with measured audio signals at times of sound in the physical environment, but when there is no sound in the physical environment, then the room model relies on the processing of the image and an estimation of the acoustic surface parameters (e.g., blocks 106, 108, 114, 110, 112, 116, and 120).

The target audio signal can contain, for example, a user's speech. In such a case, the user's speech can have a virtual location at the target location in the enhanced reality environment, such that listeners would perceive the user's speech as emanating from the target location in the enhanced reality.

Surface-based Model Generator

Figure 3:
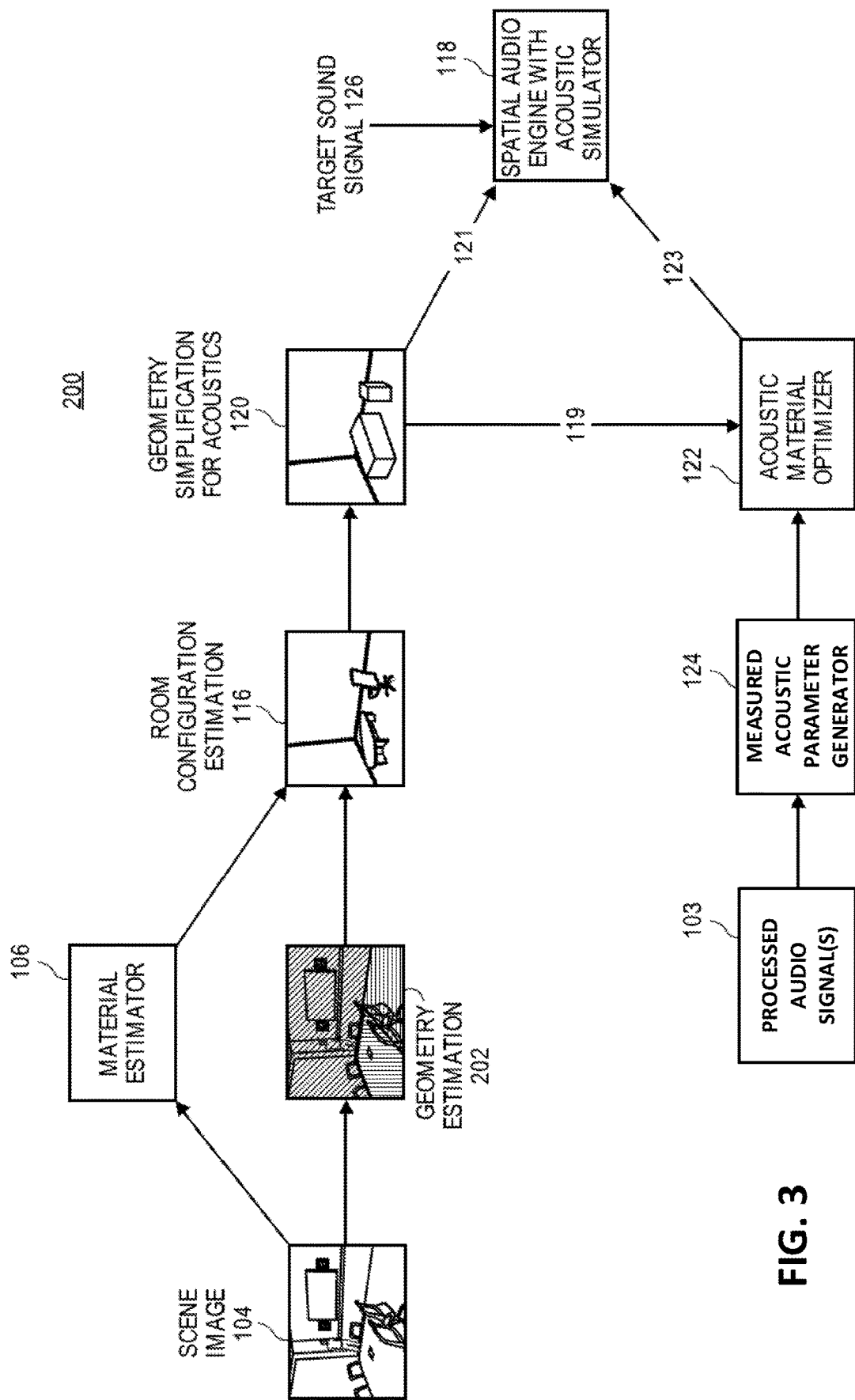
FIG. 3 illustrates a flow diagram of a method or device that processes a sound in an enhanced reality environment, in one aspect.

Referring now to FIG. 3, a system and process 200 is shown for processing sound in an enhanced reality environment, in one aspect. This system and process is similar to FIG. 2, but differs in that the geometry estimation block 202 is performed by classifying regions of the image as surfaces and shapes in three dimensional space. In other words, the image can be processed without trying to classify objects in the image as they might relate to known objects in a database. Rather, the image is processed more generally to recognize surfaces and shapes in the image which then used in block 116 to generate an estimated model of the physical environment, having a room layout and surfaces and shapes in the room. The image processing can include edge detection, semantic segmentation, instance segmentation, and other computer vision techniques that may utilize one or more neural networks to classify regions of the image as surfaces and shapes. Similar to FIG. 2, the material estimator 106 of FIG. 3 can estimate acoustic surface material characteristics of the surfaces of the room model, the difference here being that the estimated model would not have object models placed into it. The remaining features shown in FIG. 3 have been described in relation to FIG. 1 and/or FIG. 2.

Method for Processing Sound

Figure 4:
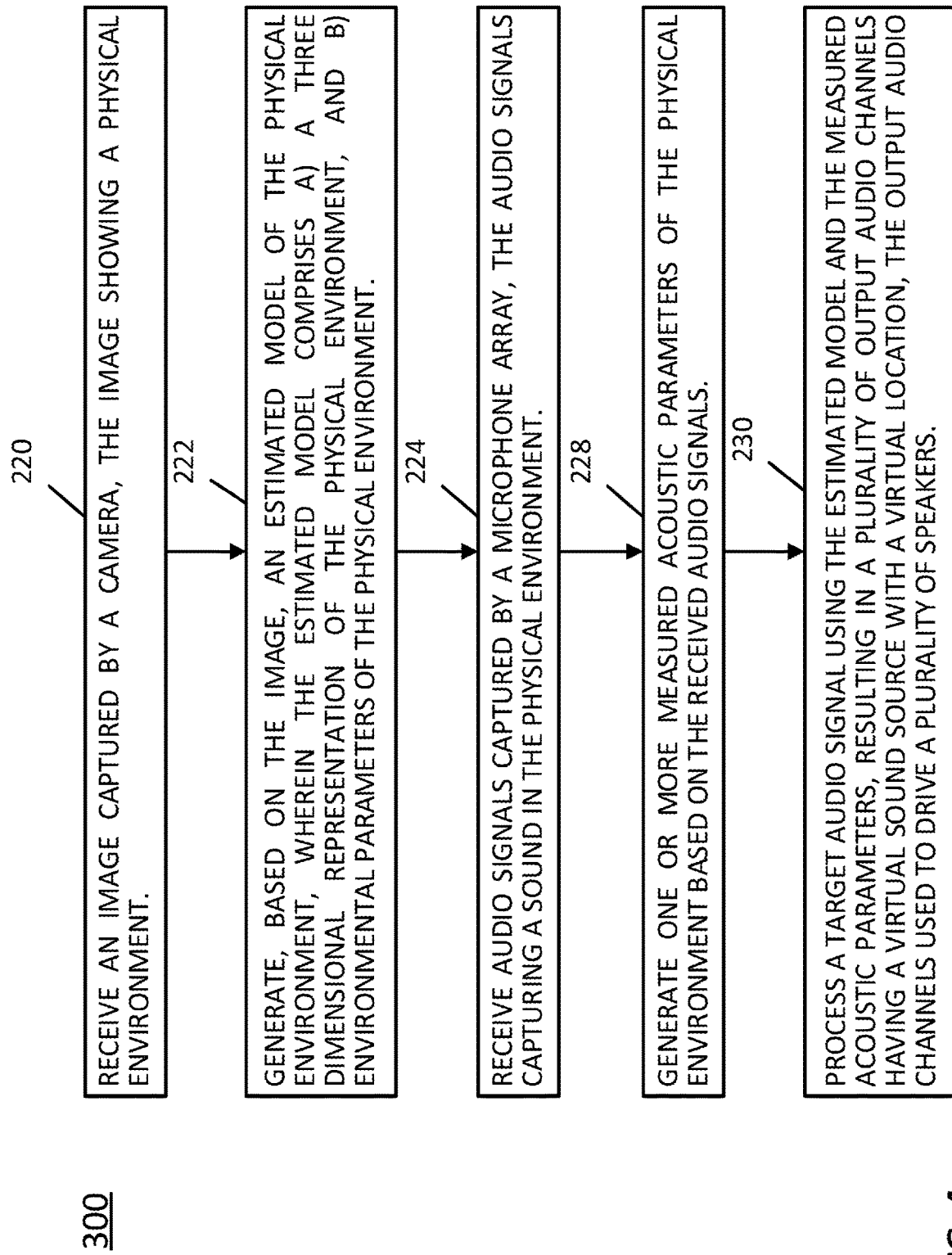
FIG. 4 illustrates a flow diagram of a method or device that processes a sound in an enhanced reality environment, in one aspect.

FIG. 4 illustrates a flowchart for processing sound in an enhanced reality environment in accordance with one example aspect. The following aspects may be described as a process 300, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc. Process 300 may be performed by processing logic that includes hardware (e.g. circuitry, dedicated logic, etc.), software (e.g., embodied on a non-transitory computer readable medium), or a combination thereof.

In block 220, the process can receive an image captured by a camera, the image showing a physical environment. In block 222, the process can generate, based on the image, an estimated model of the physical environment. The estimated model can include a) a three dimensional representation of the physical environment, and/or b) one or more acoustic surface material parameters, and/or c) one or more scattering parameters. The acoustic surface material parameters and scattering parameters can be estimated for a physical room and detected objects in the physical environment. In block 224, the process can receive audio signals captured by a microphone array, the audio signals capturing a sound in the physical environment. In block 228, the process can generate one or more measured acoustic parameters of the physical environment based on the received audio signals. In block 230, the process can process a target audio signal using the estimated model and the measured acoustic parameters (e.g., by optimizing the estimated model based on the measured acoustic parameters), resulting in a plurality of output audio channels having a virtual sound source with a virtual location, the output audio channels used to drive a plurality of speakers.

Figure 5:
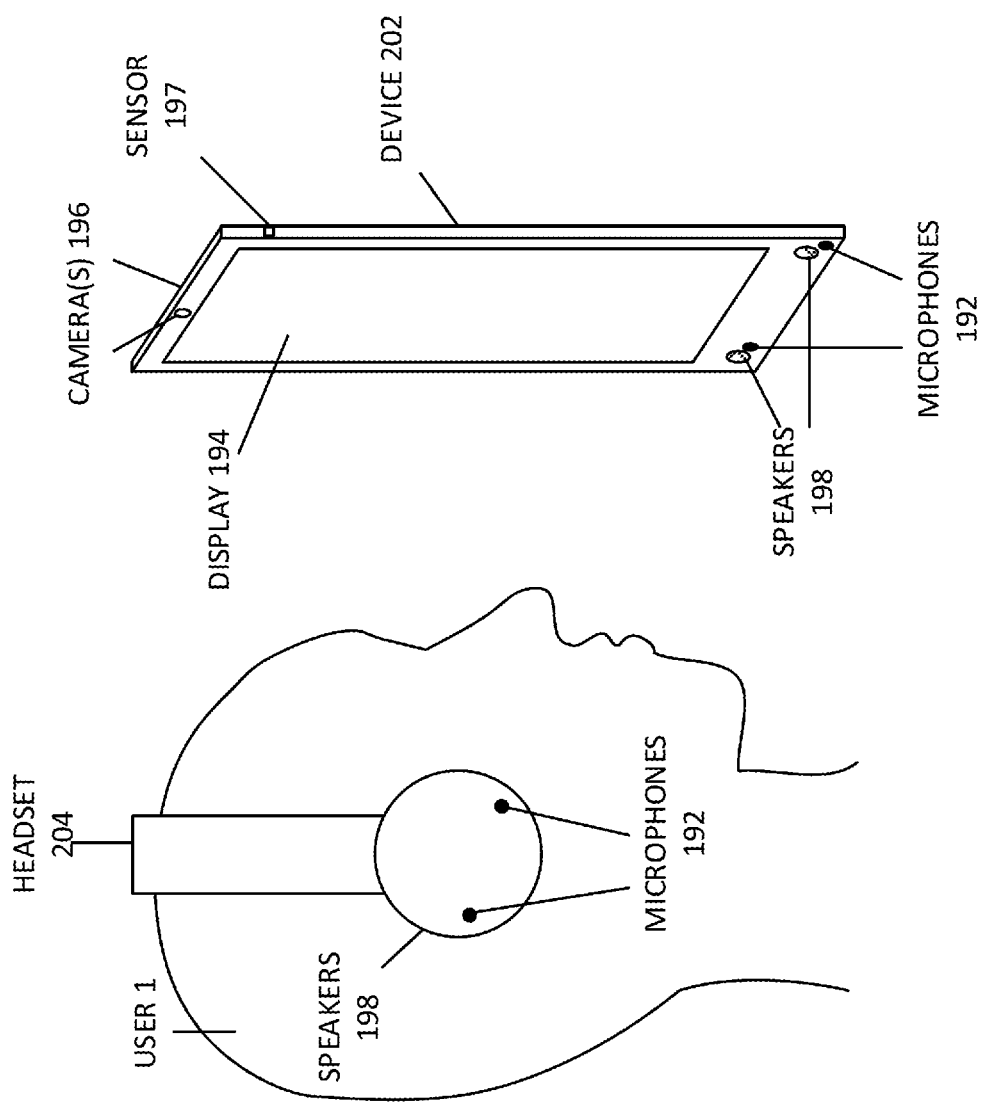
FIG. 5 illustrates a device and article of manufacture, in one aspect.

FIG. 5 shows a system that performs the processes described, in one aspect. Such a system can include a device 202. The device can have one or more cameras 196 that can generate images of the physical environment and/or capture and generate images of a user 1. The device can have a display 194 that shows an enhanced reality environment. In one aspect, the enhanced reality environment can be a representation of the physical environment around the user 1, but with one or more virtual objects rendered with it. For example, the enhanced reality environment can include a second user that is in a different physical environment, but has been rendered into the enhanced reality environment that is representative of the physical environment of user 1.

In one aspect, the device can have one or more sensors 197 such as accelerometers, GPS modules and gyroscopes. In one aspect, the device can have speakers 198 that form a speaker array. In one aspect, the speakers can generate acoustic sounds beams. In one aspect, the device can have one or more microphones 192. The microphones of the device can form one or more microphone arrays that can be used to generate audio signals. In one aspect, the microphone arrays can form acoustic pickup beams to generate a corresponding audio signal for each pickup beam.

The speakers can be driven by a plurality of output audio channels having a virtual sound source with a virtual location. For example, continuing with the previous example, the virtual sound source can be the voice of the second user. The second user can be rendered onto a position in the enhanced reality environment, and the voice of the second user can be rendered so that it sounds, to user 1, like the voice of the second user is emanating from the position. In one aspect, the speakers and/or microphones can be alternatively or additionally be included on a headset 204 worn by the user.

In one aspect, although not shown, a headset can have a display and one or more cameras, a plurality of microphones, speakers, and sensors. The enhanced reality environment can be shown visually through the display while the virtualized audio is rendered through the speakers. The microphones of the headset can pick up audio in the physical environment of the wearer and be used to generate measured acoustic parameters. The camera can generate one or more images that are used to estimate a room model. The measured acoustic parameters can be used to optimize the room model, as discussed in other sections.

Figure 7:
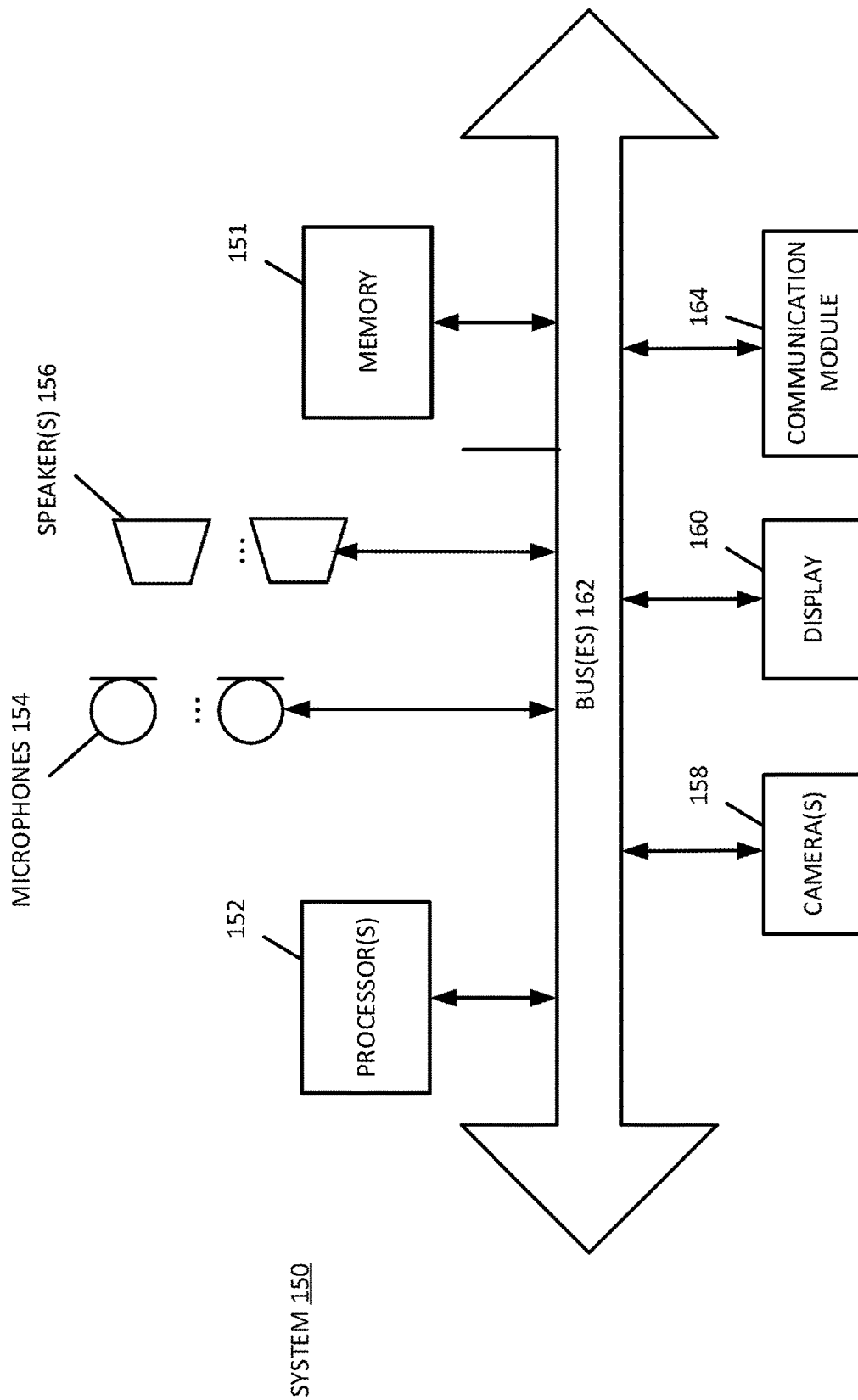
FIG. 7 illustrates an example implementation of an audio system having a programmed processor.

FIG. 7 shows a block diagram of audio processing system hardware, in one aspect, which may be used with any of the aspects described herein. This audio processing system can represent a general purpose computer system or a special purpose computer system. Note that while FIG. 7 illustrates the various components of an audio processing system that may be incorporated into headphones, speaker systems, microphone arrays and entertainment systems, it is merely one example of a particular implementation and is merely to illustrate the types of components that may be present in the audio processing system. FIG. 7 is not intended to represent any particular architecture or manner of interconnecting the components as such details are not germane to the aspects herein. It will also be appreciated that other types of audio processing systems that have fewer components than shown or more components than shown in FIG. 7 can also be used. Accordingly, the processes described herein are not limited to use with the hardware and software of FIG. 7.

As shown in FIG. 7, the audio processing system 150 (for example, a laptop computer, a desktop computer, a mobile phone, a smart phone, a tablet computer, a smart speaker, a head mounted display (HMD), or an infotainment system for an automobile or other vehicle) includes one or more buses 162 that serve to interconnect the various components of the system. One or more processors 152 are coupled to bus 162 as is known in the art. The processor(s) may be microprocessors or special purpose processors, system on chip (SOC), a central processing unit, a graphics processing unit, a processor created through an Application Specific Integrated Circuit (ASIC), or combinations thereof. Memory 151 can include Read Only Memory (ROM), volatile memory, and non-volatile memory, or combinations thereof, coupled to the bus using techniques known in the art.

Memory, although not shown in FIG. 7, can be connected to the bus and can include DRAM, a hard disk drive or a flash memory or a magnetic optical drive or magnetic memory or an optical drive or other types of memory systems that maintain data even after power is removed from the system. In one aspect, the processor 152 retrieves computer program instructions stored in a machine readable storage medium (memory) and executes those instructions to perform operations described herein.

Audio hardware, although not shown, can be coupled to the one or more buses 162 in order to receive audio signals to be processed and output by speakers 156. Audio hardware can include digital to analog and/or analog to digital converters. Audio hardware can also include audio amplifiers and filters. The audio hardware can also interface with microphones 154 (e.g., microphone arrays) to receive audio signals (whether analog or digital), digitize them if necessary, and communicate the signals to the bus 162.

Communication module 164 can communicate with remote devices and networks. For example, communication module 164 can communicate over known technologies such as Wi-Fi, 3G, 4G, 5G, Bluetooth, ZigBee, or other equivalent technologies. The communication module can include wired or wireless transmitters and receivers that can communicate (e.g., receive and transmit data) with networked devices such as servers (e.g., the cloud) and/or other devices such as remote speakers and remote microphones.

It will be appreciated that the aspects disclosed herein can utilize memory that is remote from the system, such as a network storage device which is coupled to the audio processing system through a network interface such as a modem or Ethernet interface. The buses 162 can be connected to each other through various bridges, controllers and/or adapters as is well known in the art. In one aspect, one or more network device(s) can be coupled to the bus 162. The network device(s) can be wired network devices (e.g., Ethernet) or wireless network devices (e.g., WI-FI, Bluetooth). In some aspects, various aspects described (e.g., simulation, analysis, estimation, modeling, object detection, etc.,) can be performed by a networked server in communication with the capture device. The audio system can include one or more cameras 158 and a display 160.

Various aspects described herein may be embodied, at least in part, in software. That is, the techniques may be carried out in an audio processing system in response to its processor executing a sequence of instructions contained in a storage medium, such as a non-transitory machine-readable storage medium (e.g. DRAM or flash memory). In various aspects, hardwired circuitry may be used in combination with software instructions to implement the techniques described herein. Thus the techniques are not limited to any specific combination of hardware circuitry and software, or to any particular source for the instructions executed by the audio processing system.

In the description, certain terminology is used to describe features of various aspects. For example, in certain situations, the terms "analyzer", "separator", "renderer", "estimator", "combiner", "synthesizer", "component," "unit," "module," and "logic", "extractor", "subtractor", "generator", "optimizer", "processor", and "simulator" are representative of hardware and/or software configured to perform one or more functions. For instance, examples of "hardware" include, but are not limited or restricted to an integrated circuit such as a processor (e.g., a digital signal processor, microprocessor, application specific integrated circuit, a micro-controller, etc.). Of course, the hardware may be alternatively implemented as a finite state machine or even combinatorial logic. An example of "software" includes executable code in the form of an application, an applet, a routine or even a series of instructions. As mentioned above, the software may be stored in any type of machine-readable medium.

Some portions of the preceding detailed descriptions have been presented in terms of algorithms and symbolic representations of operations on data bits within a computer memory. These algorithmic descriptions and representations are the ways used by those skilled in the audio processing arts to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of an audio processing system, or similar electronic device, that manipulates and transforms data represented as physical (electronic) quantities within the system's registers and memories into other data similarly represented as physical quantities within the system memories or registers or other such information storage, transmission or display devices.

The processes and blocks described herein are not limited to the specific examples described and are not limited to the specific orders used as examples herein. Rather, any of the processing blocks may be re-ordered, combined or removed, performed in parallel or in serial, as necessary, to achieve the results set forth above. The processing blocks associated with implementing the audio processing system may be performed by one or more programmable processors executing one or more computer programs stored on a non-transitory computer readable storage medium to perform the functions of the system. All or part of the audio processing system may be implemented as, special purpose logic circuitry (e.g., an FPGA (field-programmable gate array) and/or an ASIC (application-specific integrated circuit)). All or part of the audio system may be implemented using electronic hardware circuitry that include electronic devices such as, for example, at least one of a processor, a memory, a programmable logic device or a logic gate. Further, processes can be implemented in any combination hardware devices and software components.

While certain aspects have been described and shown in the accompanying drawings, it is to be understood that such aspects are merely illustrative of and not restrictive on the broad invention, and the invention is not limited to the specific constructions and arrangements shown and described, since various other modifications may occur to those of ordinary skill in the art. The description is thus to be regarded as illustrative instead of limiting.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A method for processing sound in an enhanced reality environment, the method comprising:
    receiving an image captured by a camera, the image showing a physical environment;
    generating, based on the image, an estimated model of the physical environment, wherein the estimated model comprises
        a three dimensional representation of the physical environment, and
        environmental parameters of the physical environment;
    receiving audio signals captured by a microphone array;
    generating one or more measured acoustic parameters of the physical environment based on the received audio signals;

detecting whether a sound of the physical environment has been captured in the audio signals;

in response to detecting the sound of the physical environment has been captured in the audio signals, modifying the estimated model with the one or more measured acoustic parameters of the physical environment resulting in an updated model of the physical environment; and processing a target audio signal using the updated model and the measured acoustic parameters, resulting in a plurality of output audio channels having a virtual sound source with a virtual location, the output audio channels to be used to drive a plurality of speakers, wherein generating the one or more measured acoustic parameters of the physical environment includes recalling previously generated acoustic parameters when no sound is detected in the audio signals.

2. The method of claim 1, wherein the environmental parameters of the physical environment include one or more acoustic surface material parameters, or one or more scattering parameters; and modifying the estimated model includes modifying the one or more acoustic surface material parameters or the one or more scattering parameters of the estimated model, based on the measured acoustic parameters.

3. The method of claim 2, wherein generating the estimated model includes:

classifying regions of the image;

based on the classified regions, detecting objects in the image, and estimating a geometry of a room of the physical environment, the geometry including one or more of the following: a size or orientation of a wall, a size or orientation of a ceiling, a size or orientation of a floor, a height, width or length of the room, or a volume of the room; and estimating the scattering parameters or acoustic surface material parameters of the room or detected objects of the estimated model.

4. The method of claim 2, wherein modifying the one or more acoustic surface material parameters or the one or more scattering parameters of the estimated model includes increasing or decreasing one or more of the acoustic surface material parameters or one or more of the scattering parameters based on comparing an estimated acoustic response of the estimated model with the measured acoustic parameters of the physical environment.

5. The method of claim 4, wherein the acoustic surface material parameters include a sound absorption parameter or a sound reduction parameter.

6. The method of claim 5, wherein processing the target audio signal includes wave based modelling or geometrical acoustics algorithms.

7. The method of claim 1, wherein generating the estimated model includes:

processing the image to recognize an object in the physical environment with a neural network trained to identify the object as corresponding to an object model in a model library, and positioning and orienting the object model within the estimated model of the physical environment.

8. The method of claim 7, wherein the object model has three dimensional parameters that define a three dimensional shape of the object model, and acoustic metadata.

9. The method of claim 8, wherein the acoustic metadata of the object model includes a scattering parameter, a sound absorption parameter, or a sound reduction parameter.

10. The method of claim 1, wherein generating the estimated model includes classifying regions of the image as surfaces and shapes in three dimensional space.

11. The method of claim 1, further comprising:

simplifying a geometry of one or more object models of the estimated model with a geometry simplification algorithm, wherein processing the target audio signal is based on the estimated model having the simplified geometry.

12. The method of claim 11, wherein the estimated model is formed as a voxel grid or a mesh data structure.

13. The method of claim 11, wherein the geometry simplification algorithm determines whether to remove an object model from the estimated model, based on a wavelength and dimensions of the object model.

14. The method of claim 11, wherein the geometry simplification algorithm simplifies a geometry of an object model more aggressively as a distance between a target location and the object model increases, and less aggressively as the distance between the target location and the object model decreases.

15. The method of claim 1, wherein the generating of the one or more measured acoustic parameters of the physical environment includes processing the audio signals to determine a reverberation characteristic of the physical environment, the reverberation characteristic defining the one or more measured acoustic parameters of the environment.

16. The method of claim 15, wherein the one or more measured acoustic parameters of the physical environment include one or more of the following: a reverberation decay rate or time, a direct to reverberation ratio, or a reverberation measurement.

17. The method of claim 16, wherein the one or more measured acoustic parameters of the physical environment are generated corresponding to one or more frequency ranges of the audio signals so that each frequency range has a corresponding measured acoustic parameter.

18. The method of claim 15, wherein generating the one or more measured acoustic parameters of the physical environment includes extracting a direct component from the audio signals;

extracting a reverberant component from the audio signals; and generating, with a trained neural network, the reverberation characteristic based on the extracted direct component and the extracted reverberant component.

19. The method of claim 1, wherein the previously generated acoustic parameters are selected based on a detected similarity between the image of the physical environment and a previous environment associated with the previously generated acoustic parameters.

20. The method of claim 1, wherein the method is performed in real-time concurrent with the image being captured and the audio signals being captured, the output audio channels drive the speakers in synchronism with a virtual visual object rendered on the image, and the virtual location of the virtual sound source corresponds to a visual location of the virtual visual object rendered on the image in the enhanced reality environment.

21. The method of claim 1, further comprising in response to sound not being detected in the physical environment, using the estimated model without modification to process the target audio signal.

22. An article of manufacture that processes audio in an enhanced reality environment, comprising:
a non-transitory machine readable medium having stored therein instructions that, when executed by a processor, cause a computing system to perform the following:
generating, based on an image of a physical environment captured by a camera, an estimated model of the physical environment, wherein the estimated model comprises a three dimensional representation of the physical environment, and environmental parameters of the physical environment;
generating one or more measured acoustic parameters of the physical environment based on processing a plurality of audio signals generated by a microphone array;
detecting whether a sound in the physical environment has been captured in the audio signals;
in response to detecting the sound in the physical environment has been captured in the audio signals, modifying the estimated model with the one or more measured acoustic parameters of the physical environment resulting in an updated model of the physical environment; and
processing a target audio signal using the updated model and the measured acoustic parameters, resulting in a plurality of output audio channels having a virtual sound source with a virtual location, wherein in response to the sound not being detected in the physical environment, using the estimated model to process the target audio signal but without said modification.

23. The article of manufacture of claim 22, wherein the environmental parameters of the physical environment include one or more acoustic surface material parameters or one or more scattering parameters, and modifying the estimated model includes modifying the one or more acoustic surface material parameters or the one or more scattering parameters of the estimated model.

24. The article of manufacture of claim 22, further comprising:
a display; and
the non-transitory machine readable medium has stored instructions that, when executed by the processor, further cause the computing system to perform the following:
rendering a virtual visual object with the image to generate a virtual visual environment encoded in data; and
driving the display with the data of the virtual visual environment;
wherein the output audio channels drive a plurality of speakers in synchronism with the virtual visual object rendered with the image, and the virtual location of the virtual sound source corresponds to a visual location of the virtual visual object rendered in the virtual visual environment.

25. A method for processing sound in an enhanced reality environment, the method comprising:
receiving an image captured by a camera, the image showing a physical environment;
generating an estimated model of the physical environment, wherein the estimated model of the physical environment comprises i) a three dimensional representation of the physical environment and ii) environmental parameters of the physical environment, wherein the environmental parameters of the physical environment include one or more acoustic surface material parameters or one or more scattering parameters, wherein generating the estimated model further comprises:
i) classifying regions of the image,
ii) based on the classified regions, detecting objects in the image and estimating a geometry of a room of the physical environment, the geometry including one or more of: a size or orientation of a wall, a size or orientation of a ceiling, a size or orientation of a floor, a height, width or length of the room, and a volume of the room, and
iii) estimating the scattering parameters or the acoustic surface material parameters of the room or of the detected objects;
receiving audio signals captured by a microphone array;
generating one or more measured acoustic parameters of the physical environment based on the received audio signals;
detecting whether a sound of the physical environment has been captured in the audio signals;
in response to detecting the sound of the physical environment has been captured in the audio signals, modifying the one or more acoustic surface material parameters or the one or more scattering parameters of the estimated model based on the measured acoustic parameters resulting in an updated model of the physical environment; and
processing a target audio signal using the updated model and the measured acoustic parameters, resulting in a plurality of output audio channels having a virtual sound source with a virtual location, the output audio channels to drive a plurality of speakers.

* * * * *